United States Patent [19]

Arpin

[11] 4,380,595
[45] * Apr. 19, 1983

[54] ENCAPSULATING SEALANT COMPOSITIONS FOR FRIABLE INSULATION MATERIALS

[75] Inventor: John Arpin, Ocean, N.J.

[73] Assignee: Arpin Products, Inc., South Belmar, N.J.

[*] Notice: The portion of the term of this patent subsequent to Aug. 31, 1999, has been disclaimed.

[21] Appl. No.: 196,571

[22] Filed: Oct. 14, 1980

[51] Int. Cl.³ ............................................... C08K 3/34
[52] U.S. Cl. ........................................ 524/5; 427/221; 427/407.1; 427/393.6; 427/387; 428/404; 524/442
[58] Field of Search ...................... 260/29.6 S, 29.6 M, 260/29.6 MM; 428/404; 427/221, 407.1, 393.6, 387; 524/5, 442

[56] References Cited

U.S. PATENT DOCUMENTS

| | | | |
|---|---|---|---|
| 4,002,590 | 1/1977 | Yoshida | 260/29.6 S |
| 4,051,094 | 9/1977 | Reuter | 260/29.6 S |
| 4,153,591 | 5/1979 | Yoshida | 260/29.6 S |
| 4,162,238 | 7/1979 | Bergna | 260/29.6 S |
| 4,185,135 | 1/1980 | Huff | 260/29.6 S |

*Primary Examiner*—Paul R. Michl
*Attorney, Agent, or Firm*—Brady, O'Boyle & Gates

[57] ABSTRACT

A penetrating sealant composition useful for encapsulating a friable material which is designed to be stored in two parts, one of said parts comprising an aqueous silicate solution comprising a water soluble alkali metal silicate such as potassium silicate or a mixture of potassium silicate and sodium silicate and a cationic or nonionic surfactant and the other part comprising an acrylic polymer dispersion component comprising an acrylic polymer latex and a reagent that reacts with alkali metal silicate. The two parts are mixed to provide a blended composition having a solids content between 20 and 65 weight percent. The sealant composition is particularly useful for friable asbestos-containing materials and the cured sealant provides a physically tough flexible barrier.

3 Claims, No Drawings

ENCAPSULATING SEALANT COMPOSITIONS FOR FRIABLE INSULATION MATERIALS

BACKGROUND OF THE INVENTION (1) Field of the Invention

The present invention relates to sealant compositions and methods for encapsulating friable materials used for thermal insulation, fireproofing, acoustical insulation and decorative finishes and is particularly applicable to the treatment of asbestos-containing materials.

(2) Description of the Prior Art

In recent years there has been an increasing awareness of the importance of environmental factors in carcinogenesis. The recognition of widespread environmental contamination by asbestos-containing materials has been of particular concern.

Such concern is evidenced in approximately twenty Federal regulations under various laws which regulate human an environmental exposure to asbestos. Despite these regulations, large segments of the population continue to be exposed to this dangerous material especially material in friable form.

The extensive use of asbestos in commerce and industry has created a health hazard of serious consequences for persons inhaling or ingesting the substance. Since the beginning of the century, asbestos has been used as a major constituent or an important additive to many consumer products so that there are many sources of exposure to the general public. For almost forty years asbestos has been widely used in building construction having been sprayed or applied onto structural steel to retard structural collapse during fire and to ceilings and walls for purposes of acoustic and thermal insulation, decoration and condensation control. Many insulation materials consist of a mixture of asbestos and mineral-, rock-, slag-wool or fibrous glass. In other formulations wood pulp and paper fibers are non-fibrous binders such as plaster of Paris, vermiculite, perlite and clay are used. Asbestos has also been used extensively as decorative and textured-spray finishes or paints. The asbestos content of these materials is usually found in the range of 5 to 50 weight percent. Some of this asbestos containing material is now known to be damaged or deteriorating and releasing fibers into the building environment.

Unlike most chemical carcinogens asbestos mineral fibers persist in the environment almost indefinitely and represent a continuous source of exposure. Asbestos fibers cannot be easily destroyed or degraded. The size and shape of these fibers give them aerodynamic capability to permit them to remain suspended in air for many hours. The fibers can become suspended in the air and are then available for respiration and retention in the lung. Fibers which have settled to the floor can be reentrained by the slightest activity in the area. Thus, even though the release of fibers may be intermittent, there is a potential for continuous exposure.

Friable material is material that can be crumbled, pulverized or reduced to powder under hand pressure. Friable material may be an asbestos-containing material or it may be a material that contains other fibers such as cellulose and glass fibers. Friable asbestos material draws particular attention since it is likely to release fibers with minimum disturbance of the surface, cause serious contamination and exposure problems and it has been used in many buildings having high population densities including schools, office buildings and high-rise apartment buildings. Furthermore, as friable asbestos material ages, it can lose its cohesive strength and more readily releases fibers. These materials were usually applied by spraying but have also been applied by troweling and brushing. They are friable in varying degrees depending on the components of the material, the amount of cement or binder added, and the method of application. Sprayed material is usually soft. Cementitious material varies from soft to relatively hard. Several methods have been proposed to eliminate or substantially reduce exposure of friable asbestos material such as by removal, encapsulation and enclosure. For encapsulation, the asbestos material is coated with a sealant. The sealing of sprayed asbestos surfaces involves applying material that will penetrate and envelop the fiber matrix and coat the surface portions to eliminate fallout and protect against abrasion damage as well as physical damage due to impact.

Sealants for friable materials which are currently available include water-based latex polymers, water soluble epoxy resins and organic solvent-based polymers of various types. However, none of these sealants have been commercially successful because they fail to provide one or more of the desirable properties required. Shortcomings associated with the available sealant compositions include the need for high-pressure application, lack of penetration, poor flexibility of the encapsulated asbestos-containing material, unacceptable impact strength and abrasion resistance, poor adhesive and cohesive strength. Also several sealant compositions have been found unacceptable since they are combustible and during combustion they generate smoke and release toxic gases.

Therefore, a need persists for a sealant composition for friable material which avoids all of the drawbacks of the prior art compositions.

SUMMARY OF THE INVENTION

The present invention provides a penetrating sealant composition useful for encapsulating a friable material designed to be stored in two parts which are mixed prior to use comprising:

Part I an aqueous silicate solution component comprising:
  (a) 20 to 40 weight percent of an aqueous alkali metal silicate selected from potassium silicate or a mixture of potassium silicate and sodium silicate;
  (b) 0.01 to 10 weight percent of a cationic or nonionic surfactant;
  (c) 60 to 80 weight percent water; and Part II an acrylic polymer dispersion component comprising:
  (a) 45 to 65 weight percent of an acrylic polymer latex having a solids content of 40 to 65 weight percent, said arcylic polymer selected from the group consisting of homopolymers and copolymers of lower alkyl esters of acrylic acid or lower alkyl esters of an alpha-lower alkyl acid or mixtures thereof;
  (b) 0.01 to 10 weight percent of a reagent that reacts with said alkali silicate; and
  (c) 35 to 55 weight percent water, wherein the ratio of Part I to Part II provides a blended composition having a solids content between 20 and 65 weight percent.

The invention also provides a method for preparing the penetrating sealant composition in the form of a two component system wherein each of the components are prepared separately and includes a method of preparing the encapsulating composition which contains optional concentrations of the foregoing ingredients. This two component system allows for the moieties to be mixed at the work site providing for a long pot life and insuring storage stability.

There is also provided a method of applying the encapsulating material of this invention to friable material which substantially improves the physical characteristics of same.

It is an object of this invention to provide a method of encapsulating friable insulating material by using the composition of this invention which affords rapid and deep penetration into the insulating material matrix, which improves adhesive and cohesive strength of the matrix by converting the friable-containing material into a solid, tough and flexible barrier having a cohesive mass of encapsulated friable material having good resistenace to mechanical abuse.

It is a particular object of the present invention to provide a penetrating sealant composition having improved characteristics for encapsulating asbestos-containing material to prevent release of asbestos fibers into the environment.

It is a further object of the present invention to provide a penetrating sealant composition for encapsulating friable asbestos containing material which also enhances physical properties of the asbestos-containing material.

DESCRIPTION OF THE PREFERRED EMBODIMENTS

According to this invention, useful products providing effective encapsulating sealant compositions for friable insulation materials are supplied as a two part system. One part comprises an aqueous silicate dispersion of selected alkali metal silicates blended with a cationic or nonionic surfactant. The other part comprises an acrylic latex composition containing a water soluble reagent that is reactive with the alkali metal silicate of the first part. These two moieties are stored separately, have increased storage life, are mixed shortly before use and preferably are formulated so that equal parts by volume are mixed to form the penetrating sealant composition that is ultimately utilized.

While the individual materials that make up the present encapsulating sealant compositions are well-known and available commercially, the combination of these materials in the proportions recited provide a tough coating which adheres to the friable material, particularly with insulation materials such as asbestos and mineral-, rock-, slag-wool with sufficient penetration to encapsulate individual fibers or particles.

PART I, the aqueous silicate component of the penetrating sealant is prepared by blending potassium silicate or a mixture of potassium silicate and sodium silicate with a cationic or nonionic surfactant and then adding water to form the aqueous silicate dispersion.

The concentration of the alkali metal silicates in the aqueous silicate solution component of Part I can range from 20 to 40 weight and preferably from 25 to 40 weight percent and most preferably from 25 to 35 weight percent. The concentration of the nonionic or cationic surfactant can range from 0.01 to 10 weight percent, preferably 0.05 to 5.0 weight percent and most preferably from 0.1 to 1.0 weight percent.

Aqueous potassium silicate is commercially available as a liquid containing 54 to 71 weight percent water and the balance potassium silicate. The potassium silicate that is used preferably has a molar ratio of $K_2O/SiO_2$ between about 1 to 4, preferably from 1.5 to 3.75 and most preferably from 2.8 and 3.2.

Aqueous sodium silicate is commercially available as a liquid containing 45 to 85 weight percent water and the balance sodium silicate. The weight ratio of $Na_2O/SiO_2$ is from 1.5 to about 3.75 in the commercially available materials.

While it is preferable that all the soluble silicate be in the form of potassium silicate it is not essential in achieving the advances of this invention that the soluble silicate consist entirely of potassium silicate. However, it has been discovered that mixtures of potassium silicate and sodium silicate having a major portion of potassium silicate provide the advantages of this invention. Preferably at least about 75 weight percent of the soluble silicate should be potassium silicate and most preferably at least about 95 weight percent. Suitable soluble silicates include potassium and sodium orthosilicate, potassium and sodium metasilicate, potassium and sodium metasilicate pentahydrate and potassium and sodium sequisilicate.

Nonionic or cationic surfactants can be employed as an ingredient in the aqueous polymer dispersion of Part II or in the alkali metal silicate dispersion of Part I or in both of the solutions, as desired. However, it was found that strongly cationic surfactants, have a tendency to precipitate the polyacrylic latex and should not be employed in the polymer dispersion.

Nonionic synthetic surfactants suitable for use in the present composition include:

1. The polyethylene oxide condensates of alkyl phenols.
2. The condensation products of aliphatic alcohols and ethylene oxide.
3. The condensation products of ethylene oxide with a hydrophobic base formed by the condensation of propylene oxide with propylene glycol.
4. Condensation products of amines, amides or mercaptans with ethylene oxide or propylene oxide.
5. Products formed by reacting ethanolamines with fatty acids.
6. Amines oxide surfactants.
7. Phosphine oxide surfactants.
8. Sulfoxide surfactants.

Of all the above described types of nonionic surfactants, preferred nonionic surfactants include the condensation product of nonyl phenol with about 9.5 moles of ethylene oxide per mole of nonyl phenol, the condensation product of coconut fatty alcohol with about 6 moles of ethylene oxide per mole of coconut fatty alcohol, the condensation product of tallow fatty alcohol with about 11 moles of ethylene oxide per mole of tallow fatty alcohol, the condensation product of a secondary fatty alcohol containing about 15 carbon atoms with about 9 moles of ethylene oxide per mole of fatty alcohol, dimethyldodecylamine oxide, dimethyltetradecylamine oxide, dimethyldodecylphosphine oxide, cetyldimethyl phosphine oxide, octadecylmethyl sulfoxide, and tetradecylmethyl sulfoxide.

Cationic synthetic surfactants suitable for use in the present composition include:

1. Amine salts.
2. Fatty esters of primary, secondary or tertiary hydroxyalkyl amines.

3. Quaternary ammonium compounds, pyridinium salts and like compounds in which the quaternary nitrogen atom is part of a ring system.

Specific examples of cationic surfactants include cetyl pyridinium chloride, cetyl trimethyl ammonium chloride, stearyl dimethyl benzyl ammonium chloride, lauryl dimethyl benzyl ammonium chloride, quaternary ammonium chloride, trimethyl octadecyl ammonium chloride, methyl polyethanol quaternary amine, didecyl dimethyl ammonium chloride, tetradecyl benzyl ammonium chloride dihydrate, coco hydroethyl imidazoline, tall oil hydroxyethyl imidazoline and oleic hydroxyethyl imidazoline.

Various other nonionic and cationic synthetic surfactants which can be employed are described in "Surface Active Agents and Detergents," Vol. II by Schwartz, Perry and Berch, Interscience (1958) and "Detergents and Emulsifiers," 1972 Annual (McCutcheon's Div., Allured) which are incorporated by reference.

Part II, the acrylic polymer dispersion component, is prepared by diluting the acrylic polymer latex with water then adding a reagent that reacts with the alkali silicate of the first part and blending until a homogeneous composition is formed. Adding a weak base such as ammonium hydroxide to adjust the pH to about 4.2 may be necessary.

The concentration of acrylic polymer latexes may range from 45 to 65 weight percent, preferably from 45 to 60 weight percent and most preferably from 50 to 55 weight percent. The concentration of the reagent that reacts with the alkali silicate of the first part may range from 0.01 to 10 weight percent, preferably from 0.1 to 5 weight percent and most preferably 0.5 to 2 weight percent.

The acrylic polymer latexes used in Part II are available commercially or can be readily prepared by well-known polymerization procedures. Suitable acrylic polymer latex compositions include homopolymers of lower alkyl esters of acrylic acid, lower alkyl ester of an alpha-lower alkyl acrylic acid or copolymers thereof, that is polymers made of two or more different acrylic acid esters and/or alpha-lower alkyl acrylic esters and copolymers of the aforementioned acrylic esters with vinyl acetate. These acrylic polymer latexes are available in emulsion form with a solids content of about 45 to 65 weight percent, a pH of 4 to 5, a viscosity of 2 to 4 poises and ranging from 8.8 to 9.25 pounds per gallon.

A wide variety of reagents can be employed to react with the alkaline metal silicate to enhance the film forming and encapsulating properties of the present sealant composition. The reagents suitably employed for this purpose include water soluble and water dispersible inorganic or organic salts and oxides of polyvalent and alkali metals. Preferred compounds are those which impart flame retardent properties to the sealant composition. Such agents include metal salts of hydroxycarboxylic acids, salts of organic acids, e.g. gallic acid, citric acid and tartaric acid. Water soluble salts are preferred inclusive of which include the borate, halide, nitrate and phosphate salts of aluminum, antimony, barium, beryllium, cadmium, calcium, sodium, chromium, cobalt, copper, lead, magnesium, mercury, silver and zinc. Most preferred reagent compounds are those which impart flame retardant properties such as potassium silicofluoride, zinc silicofluoride and hydrated sodium borate (borax).

Obviously, it may be desirable to include or add additional materials to facilitate the preparation or application of the impregnating or treating composition, or to impart collateral benefits or properties to asbestos products. In certain applications it may be advantageous to include anti-freeze compositions, foam inhibitors, corrosion inhibitors, fungicides, mildewcides, etc. Additionally if a colored product is desired, a water dispersable pigment may be added to Part II to give the composition a desirable color.

In accordance with the method of the invention, Part I and Part II formulations are seperately prepared and subsequently mixed. Preferably, each part is formulated so that equal parts of each are mixed to provide ease of preparation of the sealant composition and minimize formulating errors at the job site. In any event, each moiety should be formulated within the specific proportions given to yield a blended sealant having a total solids content between 20 and 65 weight percent preferably between 30 and 60 weight percent and most preferably between 35 and 55 weight percent.

The mixing of the two moieties may occur in several ways. The materials may be introduced into a common container and blended by agitation. The two liquid materials may be sprayed separately at low pressure with the sprays of the two materials impinging upon one another to provide a combined spray in which the spray particles are homogeneously admixed. The two liquids may be introduced into spraying equipment which has a common mixing chamber preceding the spray nozzle.

Application of the penetrating sealant composition of this invention can also be by brushing. The viscosity of the sealant composition which can be obtained by blending an aqueous acrylic resin dispersion with an aqueous potassium silicate or potassium silicate and sodium silicate mixtures is expediently so adjusted that a readily brushable mixture can be obtained.

Low pressure spraying is preferred. The penetrating sealant composition should be applied with as much caution and at as low a nozzle pressure as possible to reduce surface contact disturbance on friable asbestos-containing material since a potentially high concentration of small asbestos fibers could cause serious exposure to the worker. In any event workers should require protection with respiratory devices and decontamination. Low pressure airless spray units available commercially are suitable for such application. The application of this composition does not require any particular skill.

The coverage of the penetrating sealant composition varies depending on the condition of the friable material from about 10 to 50 square feet per gallon with a penetration of 1¾ inches. For example, a highly friable material (could be damaged by hand contact) but having no loose material hanging free would require a coverage of about 40 square feet with the same penetration.

Exposure of the coated material to ambient temperatures (e.g. 55° F. for a period of three hours) is ordinarily sufficient for the accomplishment of the desired curing and drying. Of course, variations in ambient temperatures will effect length of cure.

Upon curing, the present silicate-polymer composition provides an effective sealant for friable materials such as glass fibers, cellulose, mineral wool, synthetic resin foams (polyurethanes, polystyrenes, polyvinyl chloride, etc.), and particularly friable asbestos-containing materials. The active ingredients in the final composition form a product which eliminates fiber dispersal by adhering to the fibrous substrate with sufficient penetration into the friable asbestos-containing material matrix to prevent separation of the sealant from the asbestos material; to lock in the asbestos fibers to provide excellent abrasion and impact resistance to the enclosed asbestos material; yet to maintain good flexibility to accommodate atmospheric change, vibration and structural setting. The cured composition also provides sufficient permeability to water vapor to prevent condensation accumulation, in the asbestos material beneath the coating or the substrate. Additionally, the composition of this invention provides high flame retardant characteristics and does not release excessive smoke or toxic fumes under conditions of direct flame impingement. Likewise, the composition is neither noxious or toxic per se.

Although a single application of the coating composition may be sufficient in certain instances, it may be desirable to apply additional applications. Since the cured composition produces a cohesive mass of encapsulated friable material which is stable to weathering and aging, it provides an excellent substrate for conventional coatings and good resistance against solution by common cleaning agents.

While this invention is not to be limited by any theory or explanation it is believed that polymers are formed by certain of the ingredients which also react in the case of asbestos to etch the fibers to impart a strong cohesive bond. However, it should be understood that the many advantages and improvements provided by this invention are the result of a combination of all the component ingredients in the above approximate specified percentages.

The following are examples of various composition formulations for specific and general use, and their general method of application. It is to be understood that the compositions for and method of applying the same to specific asbestos articles or products are examplary and are not considered to limit the invention to any of the particular compositions or operating conditions outlined. Percentages and parts are by weight unless otherwise indicated.

Preparation of penetration sealant composition

EXAMPLE 1

PART I—Silicate Component

A mixture of 2.5 parts of an aqueous potassium silicate solution having a $K_2O/SiO_2$ ratio of 3.13 and a solides content of 33% (KSIL No. 6, Philadelphia Quartz Co., Philadelphia, Pa.) is blended with a 1% aqueous solution of octylphenoxy polyethoxy ethanol and then is diluted with 11 parts of water and is stirred until a homogeneous mixture is formed.

PART II—Acrylic Polymer Latex Component

To 7.5 parts of an acrylic latex having a solids content of 45%, a viscosity of 6 poises and a pH of about 4.5 (UCAR Latex 879, Union Carbide Corporation, New York, N.Y.) is blended with 6 parts of water. After a homogeneous dispersion is formed, 1% potassium silicofluoride is added with agitation. Then the pH is adjusted to about 4.2 by the addition of ammonium hydroxide.

Parts I and II are stored separately until use. Both parts are quite stable. No change occurs within one week (minimum at temperatures of 30° F. to 120° F. The final formulation is prepared by simple mixing of the components prior to use.

EXAMPLE 2

This example shows another formulation of the Part I silicate component which is compatible with the Part II of Example 1.

A mixture of 2.5 parts of an aqueous silicate component consisting of 95% potassium silicate and 5% sodium silicate is blended with a 1% aqueous solution of octylphenoxy polyethoxy ethanol and then is diluted with 11 parts of water and is stirred until a homogeneous mixture is formed.

The application of the penetrating sealant composition to friable asbestos-containing material

EXAMPLE 3

The test substrates were friable asbestos-containing material (30–35 percent chrysotile) approximately 3 inches thick over a percast cement sample and 2 inches thick on a steel support I-beam specimen. The material was highly friable (could be damaged by hand contact) but had no loose material.

Equal volume portions of silicate component (Part I) the acrylic latex component (Part II) are thoroughly blended with agitation to form a sprayable penetrating sealant composition. This composition is charged to a supply tank of an airless spray gun. The nozzle has a 0.013 inch opening which gave a fan width of 8 to 10 inches, one foot from the spray tip. The pump pressure is approximately 30 psi (as low a setting as possible to get a uniform spray pattern). The pump pressure resulted in an average nozzle pressure of 450 psi. It should be noted that although the nozzle pressure is high, it is hydraulic pressure and the liquid has an immediate pressure drop once it leaves the spray nozzle. The sealant composition is applied in one coat at a coverage rate of 1 gallon per 40 square inches to a depth of ¾ inch.

After curing at room temperature for 12 hours, a core sample from the coated friable asbestos material on the precast cement indicated a penetration of 2 inches in the 3 inch coating. Furthermore, this sample had a strong coherent mass, and is flexible and had excellent resistance to mechanical abuse. A core sample from the steel support I-beam specimen indicates a penetration to the steel I-beam (i.e. 2 inch penetration) and an enhancement of the adhesion of the asbestos-containing material to the I-beam substrate. The properties of cohesion, flexibility and resistance to mechanical abuse are similar to the other test specimen.

What is claimed is:

1. A penetrating sealant composition useful for encapsulating a friable material comprising a blend of:
   Part I an aqueous silicate solution component comprising:
   (a) 20 to 40 weight percent of an aqueous alkali metal silicate selected from potassium silicate or a mixture of potassium silicate and sodium silicate;
   (b) 0.01 to 10 weight percent of a cationic or nonionic surfactant;
   (c) 60 to 80 weight percent water; and
   Part II an acrylic polymer dispersion component comprising:
   (a) 45 to 65 weight percent of an acrylic polymer latex having a solids content of 40 to 65 weight percent, said acrylic polymer selected from the group consisting of homopolymers and copolymers of lower alkyl esters of acrylic acid or lower alkyl esters of an alpha-lower alkyl acid or mixtures thereof;

(b) 0.01 to 10 weight percent of a reagent that reacts with said alkali silicate; said reagent being selected from the group consisting of the borate, halide, nitrate and phosphate salts of aluminum, antimony, barium, beryllium, cadmium, calcium, chromium, cobalt, copper, lead, magnesium, mercury, silver and zinc, and (c) 35 to 55 weight percent water, wherein the ratio of Part I to Part II provides a blended composition having a solids content between 20 and 65 weight percent.

2. The composition according to claim 1 wherein said reagent is potassium silicofluoride, zinc silicofluoride and hydrated sodium borate.

3. In a method for enhancing the adhesion and appearance of friable materials, the improvement comprising applying to the friable material a penetrating sealant composition for encapsulating the friable material comprising a blend of:

Part I an aqueous silicate solution component comprising:

(a) 20 to 40 weight percent of an aqueous alkali metal silicate selected from potassium silicate or a mixture of potassium silicate and sodium silicate;

(b) 0.01 to 10 weight percent of a cationic or nonionic surfactant;

(c) 60 to 80 weight percent water; and

Part II an acrylic polymer dispersion component comprising:

(a) 45 to 65 weight percent of an acrylic polymer latex having a solids contant of 40 to 65 weight percent, said acrylic polymer selected from the group consisting of nomopolymers and copolymers of lower alkyl esters of acrylic acid or lower alkyl esters of an alpha-lower alkyl acid or mixtures thereof;

(b) 0.01 to 10 weight percent of a reagent that reacts with said alkali silicate; and (c) 35 to 55 weight percent water, wherein the ratio of Part I to Part II provides a blended composition having a solids content between 20 and 65 weight percent, subsequently applying a conventional coating to said composition.

* * * * *